US006991349B2

(12) United States Patent
Wang

(10) Patent No.: US 6,991,349 B2
(45) Date of Patent: Jan. 31, 2006

(54) FIXING APPARATUS FOR LIGHT SOURCE CONDUCTIVE WIRE OF BACKLIGHT MODULE

(75) Inventor: Yao-Tung Wang, Taoyuan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 10/248,230

(22) Filed: Dec. 30, 2002

(65) Prior Publication Data

US 2004/0125605 A1 Jul. 1, 2004

(51) Int. Cl.
*F21V 15/01* (2006.01)
*F21V 27/00* (2006.01)

(52) U.S. Cl. .............. 362/362; 362/457; 362/632; 174/65 R

(58) Field of Classification Search .......... 362/31, 362/457, 561, 362, 630–634; 349/58, 60–62, 349/65; 439/445–447, 449; 174/65, 65 R; 361/826, 827, 681, 682
See application file for complete search history.

(56) References Cited

U.S. PATENT DOCUMENTS

| | | | | |
|---|---|---|---|---|
| 4,719,314 A | * | 1/1988 | Nothnagel et al. | 174/65 R |
| 5,280,372 A | * | 1/1994 | Horiuchi | 349/65 |
| 5,375,005 A | * | 12/1994 | Komano | 349/58 |
| 5,433,024 A | * | 7/1995 | Lerner | 362/31 |
| 5,719,752 A | * | 2/1998 | Mori et al. | 349/58 |
| 5,815,227 A | * | 9/1998 | Lee | 349/65 |
| 6,386,722 B2 | * | 5/2002 | Okumura | 362/31 |
| 6,525,789 B1 | * | 2/2003 | Lee | 349/58 |
| 6,762,806 B1 | * | 7/2004 | Matsuo et al. | 349/58 |
| 2002/0171784 A1 | * | 11/2002 | Choi et al. | 349/58 |
| 2003/0016312 A1 | * | 1/2003 | Park et al. | 349/58 |

FOREIGN PATENT DOCUMENTS

| | | | |
|---|---|---|---|
| JP | 46-076443 | | 8/1971 |
| JP | 03-091614 | | 4/1991 |
| JP | 05045650 A | * | 2/1993 |
| JP | 08-315620 | | 11/1996 |
| JP | 2002-033044 | | 1/2002 |
| JP | 2002-190208 | | 5/2002 |
| JP | 2002-324423 | | 8/2002 |

\* cited by examiner

*Primary Examiner*—Alan Cariaso
(74) *Attorney, Agent, or Firm*—Jianq Chyun IP Office

(57) ABSTRACT

A fixing apparatus for a light source conductive wire, suitable for use to fix the light source conductive wire. The fixing apparatus has an attaching part, a holding part and a wire protruding part. The attaching part and the holding part are both attached to the light source conductive wire to a backlight module, while the wire protruding part is connected between the attaching part and the holding part to hold the light source conductive wire. The wire protruding part has a wire outlet allowing protrusion of the light source conductive wire. The fixing apparatus prevents the light source conductive wire from being detached during the iron frame assembly of the backlight module, so as to enhance the product yield.

32 Claims, 4 Drawing Sheets

FIXING APPARATUS FOR LIGHT SOURCE CONDUCTIVE WIRE OF BACKLIGHT MODULE

BACKGROUND OF INVENTION

1. Field of the Invention

The invention relates in general to a backlight module, and more particular, to a fixing apparatus for light source conductive wires of the backlight module.

2. Related Art of the Invention

Liquid crystal displays (LCD's) have been broadly applied recently. Following the improvement of driving technique, advantages such as lower consumption power, thin and light body, and low driving voltages allow the liquid crystal displays to be applied in video cameras, notebook computers, desktop computers and various types of projecting equipment.

The commonly seen liquid crystal displays comprise thin-film transistor liquid crystal display (TFT-LCD). As the liquid crystal display itself does not illuminate, a white light source is required as the backlight to display the image. The light source frequently used in the thin-film transistor liquid crystal display includes cold cathode fluorescent tube (CCFT) and hot cathode fluorescent tube (HCFT), both of which are low-pressure mercury type. The typical structure of the lamp tube includes electrodes at two sides. Phosphor (R, G, B) is coated on the internal wall thereof, and mercury vapor and some rare gas are filled and sealed therein. While applying a voltage to two electrodes, accelerated electrons are generated to bombard the mercury and the rare gas atoms into an excited state. When the excited mercury and rare gas atoms fall back to the ground state, ultra-violet light is released. The ultra-violet light then impinges on the internal wall to generate white light. For all types of light sources, the conductive wire of the light source has to be pulled out to allow voltage application during backlight module assembly.

As shown in FIGS. 1A and 1B, a schematic drawing of a backlight module is shown. The backlight module 100 includes a light emitting surface 110, a bottom surface 120, a wiring side surface 190, and a groove 140. During the iron frame assembling process of the backlight module 100, the light source conductive wire 130 is mounted in the groove 140 of the backlight module 100 to complete the assembly. However, the trend for fabricating thin and light liquid crystal displays has caused the fixture of the light source conductive wire 130 to become unstable and easily detached from the backlight module 100. Consequently, the product yield is poor.

SUMMARY OF INVENTION

The present invention provides a fixing apparatus for a light source conductive wire suitable for use in a backlight module. The backlight module includes a light emitting surface and an opposing bottom surface. The fixing apparatus of the light source conductive wire includes an attaching part, a holding part and a wire protruding part. The attaching part is attached to the light emitting surface or the bottom surface of the backlight module. The wire protruding part connects the attaching part and the holding part. The wire protruding part has a wire outlet allowing the light source conductive wire to extend out of the backlight module. The holding part, the wire protruding part and the attaching part construct a support structure, and the holding part holds the light source conductive wire between the fixing apparatus and the backlight module.

In one embodiment of the present invention, the material of the fixing apparatus of the light source conductive wire includes SUS-series metal material with a thickness of about 0.1 mm. The attaching part and the backlight module are mounted by applying a screw or adhesive. When a screw is used, a hole is formed in the attaching part allowing the screw to thread through. When the glue is used, adhesive material such as glue can be applied between the attaching part and the backlight module.

The present invention further provides a fixing apparatus for a light source conductive wire applicable in a backlight module, which includes a light emitting surface, a bottom surface opposing to the projecting surface and a wiring side surface. The fixing apparatus for the light source conductive wire comprises an attaching part and a wire protruding part. The attaching part is attached to the light emitting surface or the bottom surface of the backlight module. The wire protruding part is connected to the attaching part and is attached to the wiring side surface. The wire protruding part has a wire outlet allowing protrusion of the light source conductive wire.

In one embodiment of the present invention, the material of the fixing apparatus of the light source conductive wire includes SUS-series metal material with a thickness of about 0.1 mm. The attaching part is attached to the backlight module by applying a screw or adhesive. When a screw is used, a hole is formed in the attaching part allowing the screw to thread through. When glue is used, adhesive material such as glue can be applied between the attaching part and the backlight module.

Further, the fixing apparatus of the light source conductive wire and the backlight module construct a planar light source, and the light source conductive wire is wrapped with a thermal compressed tube or an insulation tape to prevent it from being damaged by the fixing apparatus or the iron frame.

BRIEF DESCRIPTION OF DRAWINGS

These, as well as other features of the present invention, will become more apparent upon reference to the drawings wherein.

DETAILED DESCRIPTION

Figure 1A:
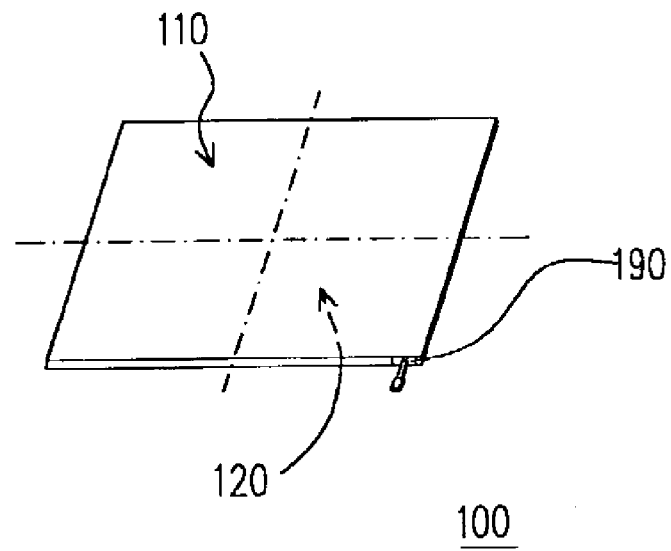
FIG. 1A shows a schematic drawing of a backlight module.
Figure 1B:
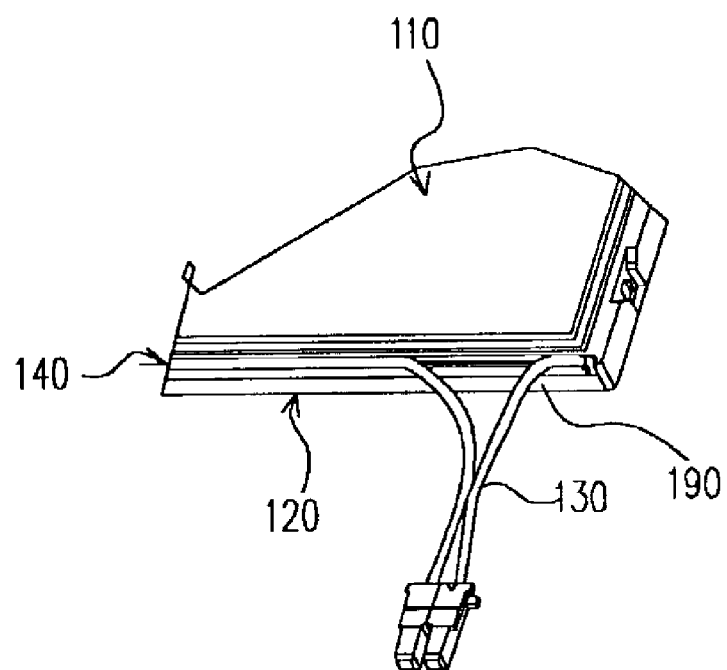
FIG. 1B shows the wire protruding position of the backlight module as shown in FIG. 1A.
Figure 2A:
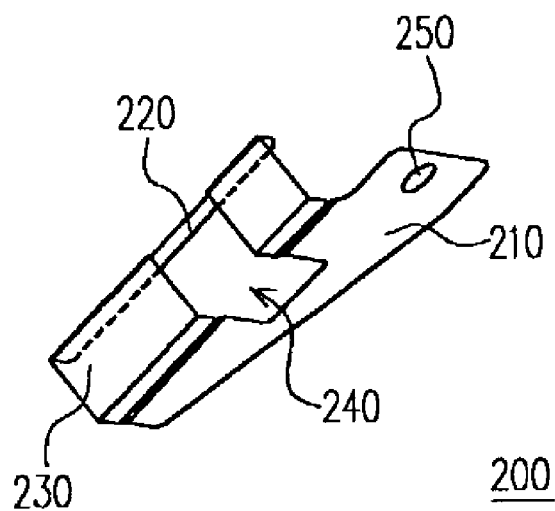
FIG. 2A shows a fixing apparatus for a conductive wire of a light source in one embodiment of the present invention.
Figure 2B:
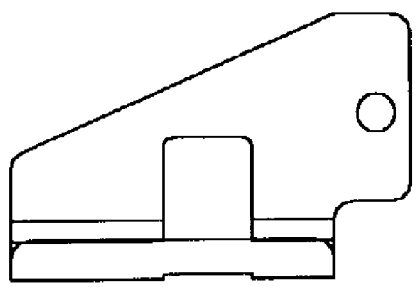
FIG. 2B shows a top view of FIG. 2A.
Figure 2C:
FIG. 2C shows a side view of FIG. 2A.
Figure 2D:
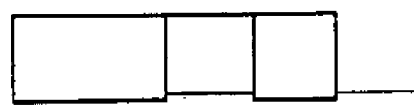
FIG. 2D shows a front view of FIG. 2A.

FIG. 2A shows a perspective view of a light source conductive wire in one embodiment of the present invention, and FIGS. 2B, 2C and 2D show the top view, side view and front view thereof, respectively. It is appreciated that the dimensions illustrated here are to match with the applied backlight module. When a backlight module with different size is applied, modification of the dimensions is required. As shown in FIG. 2A, the fixing apparatus 200 of a light source conductive wire comprises an attaching part 210, a holding part 220 and a wire protruding part 230. The attaching part 210 is attached to a backlight module. The holding part 220 is also attached to the backlight module allowing the light source conductive wire to be maintained between the backlight module and the fixing apparatus 200. The wire protruding part 230 is connected to the attaching part 210 and the holding part 220. The wiring protruding part 230 has a wire outlet 240, from which the light source conductive wire can extend out of the backlight module. The size of the wire outlet 240 is determined according to the number of light source conductive wires required to protrude. For the assembly convenience, the size is preferably larger then the terminal of the light source conductive wires. In this embodiment, the wire outlet extends from the wire protruding part 230 downward towards the attaching part 210 to provide enough space. When the terminal of the light source conductive wire is larger, the wire outlet 240 can further extend to partition the attaching part 210 to provide assembly convenience.

The fixing apparatus 200 of the light source conductive wire is integrally formed of SUS-series metal material, for example. The thickness of the fixing apparatus 200 is about 0.1 mm. The way for attaching the fixing apparatus 200 to the backlight module include using a screw threading through a hole 250 formed in the attaching part 210. Alternatively, the fixing apparatus 200 can also be adhered to the backlight module by applying glue in between instead of using the screw.

Figure 3A:
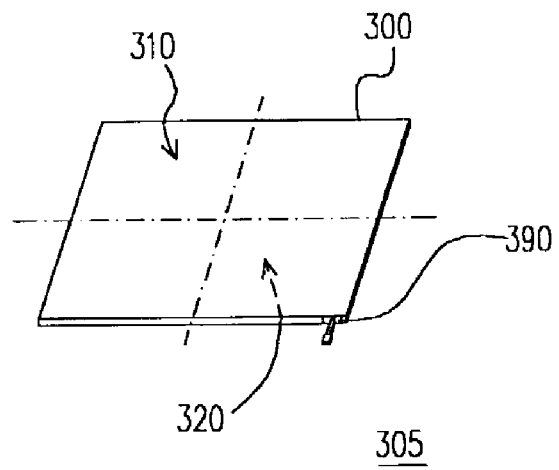
FIG. 3A shows a planar light source apparatus according to one embodiment of the present invention.
Figure 3B:
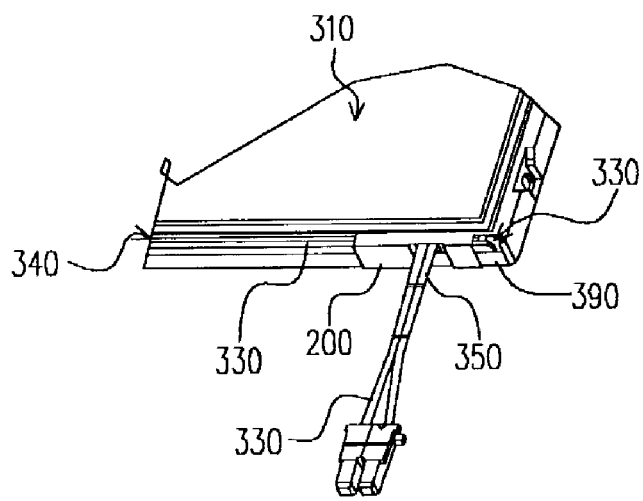
FIG. 3B shows the enlargement view of the wire protruding position of the backlight module of the planar light source as shown in FIG. 3A.
Figure 3C:
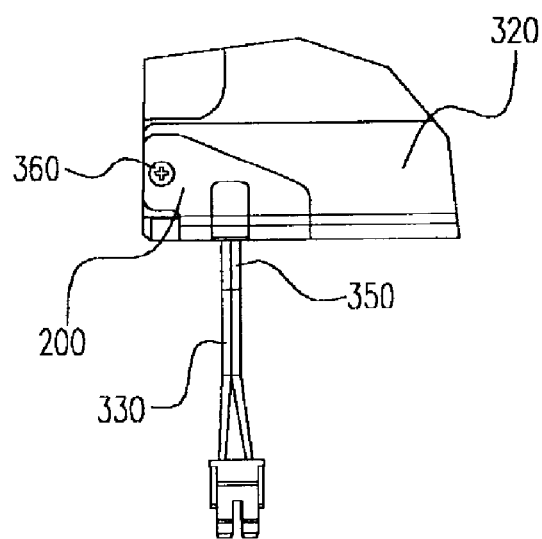
FIG. 3C shows the opposing side of FIG. 3B.

FIG. 3A shows a planar light source 305 assembled by the fixing apparatus 200 as shown in FIG. 2A and a backlight module 300. FIG. 3B shows the enlarged view of the wire protruding part of the planar light source 305 as shown in FIG. 3A. FIG. 3C shows the opposing side of FIG. 3B. The backlight module 300 comprises a light emitting surface 310, a bottom surface 320, a wiring side surface 390 and a groove 340. The white light source of the backlight module is uniformly emitted from the light emitting surface 310. The light source conductive wire 330 is not only positioned in the groove 340 along the wiring side surface 390, but is further fixed by the fixing apparatus 200 as shown in FIG. 2A to avoid detachment or breakage by external force. To avoid damaging the light source conductive wire 330 to cause high voltage leakage, a thermal compression tube 350 is used for protection. It is appreciated that insulating tape or other similar material can also be used to provide the same function. In FIG. 3C, a screw 360 is used to attach the fixing apparatus 200 to the backlight module.

Figure 4A:
FIG. 4A shows a top view of the fixing apparatus in another embodiment of the present invention.
Figures 4B, 4C:
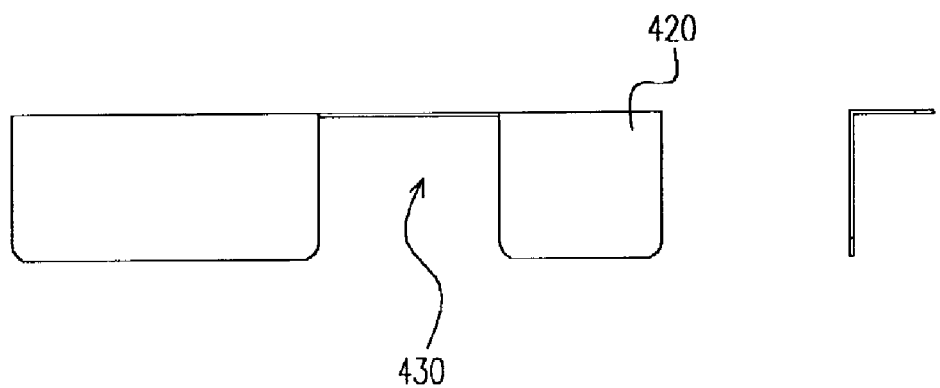
FIG. 4B shows a side view of the fixing apparatus as shown in FIG. 4A.
FIG. 4C shows a front view of the fixing apparatus as shown in FIG. 4A.

FIG. 4A shows a top view of a fixing apparatus for a light source conductive wire in another embodiment of the present invention. FIG. 4B is a side view of FIG. 4A, and FIG. 4B is a front view of FIG. 4A. Similarly, the dimension of the fixing apparatus has to comply with the size of the backlight module. The fixing apparatus includes an attaching part 410 and a wire protruding part 420. The attaching part 410 is used to attach the fixing apparatus to the backlight module. The wire protruding part 420 is connected to the attaching part 410, and is attached to the wiring side surface 390 of the backlight module as shown in FIG. 3A. The wire protruding part 420 has a wire outlet 430 allowing the light source conductive wire to exit. Similarly, the size of the wire outlet 430 is determined according to required amount of the protruding wires.

The fixing apparatus is integrally formed of SUS-series metal material, for example. The thickness of the fixing apparatus is about 0.1 mm. FIGS. 4A to 4C use the adhesion to attach the fixing apparatus and the backlight module, so that the attaching part 420 does not include a hole. A rear-side adhesive providing assembling convenience is optional.

From the above description, the fixing apparatus for the light source conductive wire of a backlight module has at least the following advantages:

1. The detachment of conductive wire during assembling process of the iron frame is avoided, so that the product yield is increased.
2. The breakage due to external force is avoided.
3. The risk of high voltage leakage caused by damage of light source conductive wire is avoided.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A fixing apparatus, suitable for use in a backlight module having a light emitting surface and a bottom surface opposing the light emitting surface, the fixing apparatus comprising:
   an attaching part, attaching to one of the light emitting surface and the bottom surface;
   a holding part, attaching to the other one of the light emitting surface and the bottom surface of the backlight module; and
   a wire protruding part, connecting between the attaching part and the holding part, the wire protruding part having a wire outlet for allowing a wire to penetrate out through a surface of the wire protruding part,
   wherein the attaching, holding, and wire protruding parts are in a solid structure, and the attaching part is to be affixed to one of the light emitting surface and the bottom surface at a fixed position.

2. The fixing apparatus according to claim 1, further comprising a metal material.

3. The fixing apparatus according to claim 1, having a thickness of about 0.1 mm.

4. The fixing apparatus according to claim 1, wherein the attaching part, the holding part and the wire protruding pan are integrally formed.

5. The fixing apparatus according to claim 1, wherein the attaching part includes a hole allowing a screw to thread through.

6. The fixing apparatus according to claim 1, further includes a glue applied between the attaching part and either the light emitting surface or the bottom surface.

7. The fixing apparatus according to claim 1, wherein the wire outlet of the wire protruding part extends to the attaching part.

8. A planar light source, comprising:
   a backlight module, having a light source conductive wire; and
   a fixing apparatus for the light source conductive wire, attached and affixed to a top surface or a bottom surface of the backlight module at a fixed position to hold the light source conductive wire therebetween, the fixing apparatus having a wire outlet allowing the light source conductive wire to penetrate out through a surface of the fixing apparatus.

9. The planar light source according to claim 8, wherein the fixing apparatus further comprises:
an attaching part, attached to the top surface or the bottom surface of the backlight module;
a holding part, attached to the other surface of the backlight module; and
a wire protruding part, connected between the attaching part and the holding part, the wire protruding part comprising the wire outlet,
wherein the attaching part is affixed to the one surface of the backlight module at the fixed position.

10. The planar light source according to claim 8, wherein the fixing apparatus is made of a metal material.

11. The planar light source according to claim 8, wherein the fixing apparatus has a thickness of about 0.1 mm.

12. The planar light source according to claim 9, wherein the attaching part, the holding part and the wire protruding part are integrally formed.

13. The planer light source according to claim 8, wherein the fixing apparatus is attached to the backlight module by a screw.

14. The planar light source according to claim 8, wherein the fixing apparatus is adhered to the backlight module by adhesive.

15. The planar light source according to claim 8, further comprising a thermal compression tube to wrap the light source conductive wire.

16. The planar light source according to claim 8, further comprising an insulation tape to wrap the light source conductive wire.

17. The planar light source according to claim 8, further comprising a groove in which the light source conductive wire is positioned.

18. A fixing apparatus for a light source conductive wire, applicable to a backlight module with a light emitting surface, an opposing bottom surface and a wiring side surface, comprising:
an attaching part, attached and affixed to either the light emitting surface or the bottom surface at a fixed position; and
a wire protruding part, attached to the wiring side surface, the wire protruding part having a wire outlet, wherein the wire outlet of the wire protruding part extends to the attaching part and the wire outlet allows a wire to penetrate out through a surface of the wire protruding part.

19. The fixing apparatus according to claim 18, further comprising a metal material.

20. The fixing apparatus according to claim 18, having a thickness of about 0.1 mm.

21. The fixing apparatus according to claim 18, wherein the attaching part and the wire protruding part are integrally formed.

22. The fixing apparatus according to claim 18, wherein the attaching part includes a hole allowing a screw to thread through.

23. The fixing apparatus according to claim 18, further includes a glue applied between the attaching part and either the light emitting surface or the bottom surface.

24. A planar light source, comprising:
a backlight module, having a light source conductive wire protruding from a wiring side surface thereof; and
a fixing apparatus for the light source conductive wire, attached and affixed to a top surface or a bottom surface of the backlight module at a fixed position to hold the light source conductive wire therebetween, the fixing apparatus having a wire outlet allowing the light source conductive wire to penetrate out through a surface of the fixing apparatus.

25. The planar light source according to claim 24, wherein the fixing apparatus further comprises:
an attaching part, attached to one of the top surface and the bottom surface of the backlight module; and
a wire protruding part, connected to the attaching part, the wire protruding part comprising the wire outlet,
wherein the attaching part is affixed to the one surface of the backlight module at the fixed position.

26. The planar light source according to claim 24, wherein the fixing apparatus is made of a metal material.

27. The planar light source according to claim 24, wherein the fixing apparatus has a thickness of about 0.1 mm.

28. The planar light source according to claim 25, wherein the attaching part and the wire protruding part are integrally formed.

29. The planar tight source according to claim 24, wherein the fixing apparatus is adhered to the backlight module by adhesive.

30. The planar light source according to claim 24, further comprising a thermal compression tube to wrap the light source conductive wire.

31. The planar light source according to claim 24, further comprising an insulation tape to wrap the light source conductive wire.

32. The planar light source according to claim 24, further comprising a groove in which the light source conductive wire is positioned.

* * * * *